United States Patent
Venkateswar

(10) Patent No.: US 6,330,362 B1
(45) Date of Patent: Dec. 11, 2001

(54) COMPRESSION FOR MULTI-LEVEL SCREENED IMAGES

(75) Inventor: Vadlamannati Venkateswar, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/747,291

(22) Filed: Nov. 12, 1996

(51) Int. Cl.[7] .................................................. G06K 9/36
(52) U.S. Cl. .................................. 382/232; 358/261.3
(58) Field of Search .................................. 382/232, 236, 382/244, 245, 238, 251, 250, 282, 319; 395/109, 114, 116; 375/240, 245, 253, 240.01, 240.29; 348/419, 384.1–440.1; 345/202; 341/59, 65, 67; 358/426–433, 261.3, 261.1, 262.2; 235/449–450; 708/203

(56) References Cited

U.S. PATENT DOCUMENTS

| | | | |
|---|---|---|---|
| 4,093,962 | * 6/1978 | Ishiguro et al. | 348/419 |
| 4,144,547 | 3/1979 | Stoffel | 358/260 |
| 4,193,096 | 3/1980 | Stoffel | 358/260 |
| 4,302,775 | * 11/1981 | Widergren et al. | 382/232 |
| 4,729,034 | 3/1988 | Roberts et al. | 358/261 |
| 4,897,855 | * 1/1990 | Acampora | 375/245 |
| 5,091,782 | * 2/1992 | Krause et al. | 382/236 |
| 5,333,211 | 7/1994 | Kanda et al. | 382/54 |
| 5,454,053 | 9/1995 | Okubo et al. | 382/270 |
| 5,479,587 | * 12/1995 | Campbell et al. | 395/116 |
| 5,483,622 | * 1/1996 | Zimmerman et al. | 395/114 |
| 5,517,327 | 5/1996 | Nakatani et al. | 358/462 |
| 5,596,602 | * 1/1997 | Couwenhoven et al. | 375/240 |
| 5,602,971 | * 2/1997 | Deschuytere | 395/109 |

FOREIGN PATENT DOCUMENTS

WO 91/19272   12/1991   (WO) .

OTHER PUBLICATIONS

Nikhill Balram et al "Noncausal Predictive Image Codec", IEEE Tarnsactions on Image Processing, vol. 5, No. 8, Aug. 1996.*

Johnsen et al. "An Extension of the CCITT Facsimile Codes for Dithered Pictures," The Bell System Technical Journal, vol. 60, No. 3, Mar. 1981, pp. 391–404.

Forchhammer et al. "Algorithms for Coding Scanned Halftone Pictures," 9th International Conference on Pattern Recognition, Nov. 14–17, 1988, Rome, Italy, vol. 1, 1988, IEEE (US), pp. 297–299.

* cited by examiner

*Primary Examiner*—Samir Ahmed
(74) *Attorney, Agent, or Firm*—Wade James Brady, III; Frederick J. Telecky, Jr.

(57) ABSTRACT

A method for compressing screened image data for printing. The data is generated by tiling an image with multi-pixel cells. The pixels within any one cell may or may not be rescanned to be better fit for compression. The method allows for selection between two compression paths, one which has no loss (24), the other which is lossy (26). Once the data is compressed, the information is stored in a buffer (16), then sent to the exposure module. If the lossy scheme is selected, a quantization factor (14) is used in compression that may be adjusted, depending upon feedback signals (18,20), to increase or decrease the compression.

16 Claims, 2 Drawing Sheets

Fig.2a  SCANNING ORDER OF PIXELS

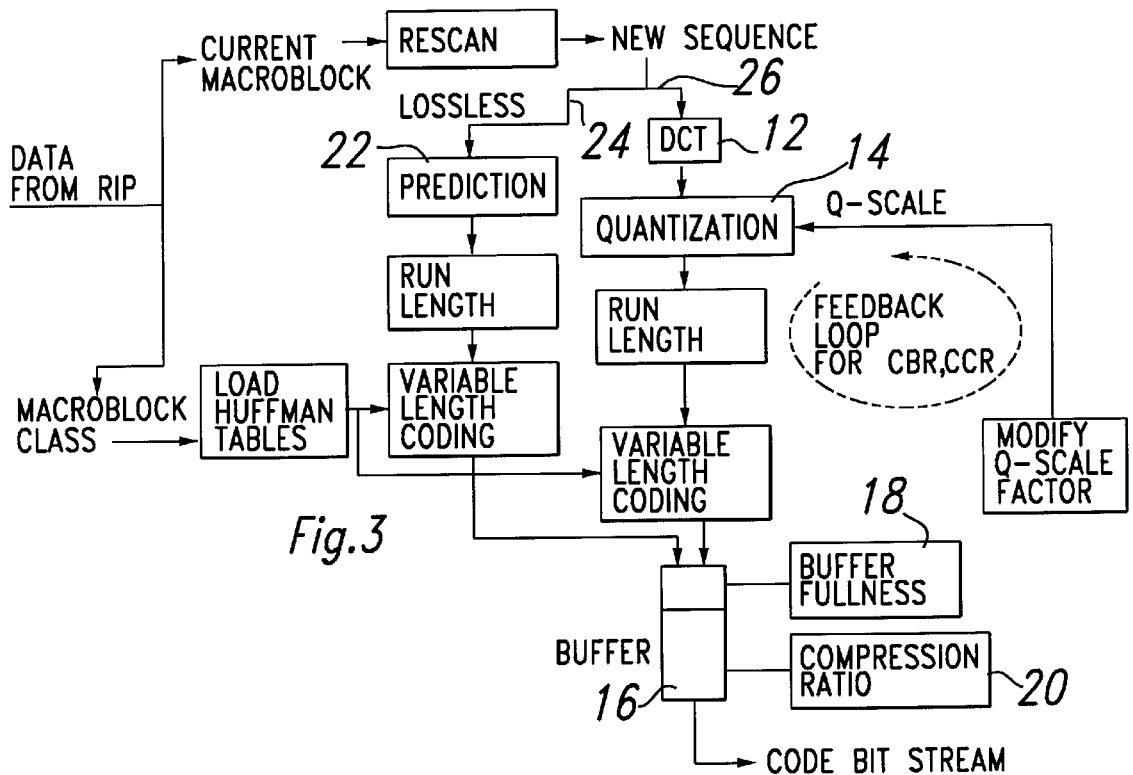
Fig.3
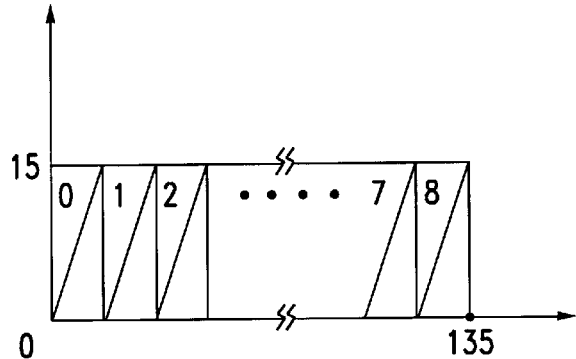
Fig.4a
Fig.4b

COMPRESSION FOR MULTI-LEVEL SCREENED IMAGES

BACKGROUND OF THE INVENTION

1. Field of the Invention

This invention relates to printing processes, more particularly to screening processes for images to be printed.

2. Background of the Invention

There are different printing technologies like electrophotography, dye sublimation, ink jet, offset, etc. Although dye sublimation technology can realize significant number of gray levels per pixel, other technologies realize fewer. For example, a spatial light modulator based electrophotographic printer can realize between 16–32 gray levels per pixel. In order to simulate the appearance of continuous tone (contone) on these printers it is necessary to use an approach called multi-level screening. Multi-level refers to multiple level of gray shades realized by these printers, but the numbers of levels is much less than 256, which is typically required to reproduce contone data.

As an example of multi-level printing, suppose an image is to be printed on a 600 dpi (dots per inch) printer that can only reproduce 16 levels (4 bits) of gray. The page containing the image can be logically divided into 4 pixels wide—4 pixel high blocks (cells) that completely tile the page. Each pixel in the cell can represent one of 16 shades, the cell itself can totally simulate 241[(16−1)×4×4+1] gray shades. For example, filling a pixel with level 15 and another with level 10 would result in a simulated gray shade of 25. Several techniques can be used to decide the order in which pixels in a cell are filled.

Digital data compression is a technique that is used in systems (including printers) when there are constraints on available memory or in bandwidth. Typically, digital compression methods work on contone data. In printers, compression methods can be used to reduce the amount of frame buffer memory required when printing a page. The input to a printer is a page description language (like PostScript, PCL, etc.) which is converted by a processor called a Raster Image Processor (RIP) to a pixel map in a frame buffer.

When memory available is limited, the output bitmap is generated a band at a time and compressed. As an example, for a 8½"×11", 600×600 dpi printer with 4 bits per pixel and 4 color planes, the total memory is required is 64 Mbytes. However, if the RIP generates a ½" band at a time, compresses it by a factor of 8 and stores it, the effective memory required is $^{64}/_{8}$+Memory for 1 band which equals 8+11×600×600×⅛, or 8.95 Mbytes (assuming that a band is in the 11" direction and ½" tall). This is significantly less than the memory required for a full frame buffer system.

Further, in full frame buffer systems compression may be required if the data link from memory to the marking engine is of limited bandwidth. However, no effective method of compressing multi-level data currently exists. Clearly, the need for one exists.

SUMMARY OF THE INVENTION

It is one aspect of the invention to provide a method to compress screened image data for printing. In screened images, the image is divided into screen cells or tiles. The pixels within each cell may or may not be rescanned based upon their relationships to the other pixels. Additionally, the data can be rescanned based upon a prestored order. The data is then compressed in either one of two possible compression schemes. After the data is compressed, it is stored in a buffer, then sent to an exposure module for printing.

In one embodiment of the method, lossy compression is used. A quantization factor is used in the compression scheme and is adjusted based upon feedback signals.

It is a further advantage of this method in that it allows the bandwidth necessary to communicate between the processor and the exposure module to be reduced.

It is a further advantage of this method in that it requires less memory than a full frame buffer system.

BRIEF DESCRIPTION OF THE DRAWINGS

For a more complete understanding of the present invention and for further advantages thereof, reference is now made to the following Detailed Description taken in conjunction with the accompanying Drawings in which:

FIGS. 1a and 1b show an example of a cell used in screening an image and its related tone curves.

FIGS. 2a to 2c shows embodiments of reformatting the data for more efficient compression.

FIG. 3 shows a flow chart for a method of compressing screen data.

FIGS. 4a and 4b show the cell structure and tone curves for one embodiment of a compression scheme for screen data.

DETAILED DESCRIPTION OF THE PREFERRED EMBODIMENTS

Figures 1A, 1B, 2B, 2C:
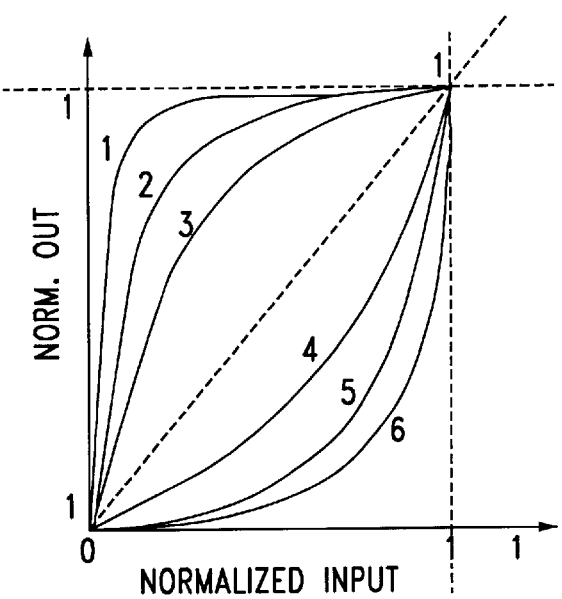

FIG. 1a shows an example of a 5×5 cell that could be used to screen an image. The image is tiled with a number of these cells. Within each cell, the classes of the pixels are shown for this example. A pixel's class depends upon its perpendicular distance from the center of the cell. Once pixels are classified, the relationship between the input and output for each class of pixels is defined by a tone curve.

In FIG. 1b, tone curves for the pixels of FIG. 1a are shown. These tone curves result in clustered dot screening. A clustered dot screen has the pixels of the lower-numbered classes filled first. This results in a grouping of high density pixels in the center of the cell. Other types of tone curves are also used, with the most general case for a 5×5 cell having 25 classes and 25 tone curves.

For compression purposes, the image is divided into macrocells, which are rectangular blocks of pixels with an integer number of cells in the X and Y direction. For example, the 10×10 block of FIG. 1a, with 2 cells in the x and y directions can form macrocells. Information derived from the RIP on a macrocell basis can be used to adapt the compression scheme for each macrocell.

A RIP decomposes a page description language like PostScript, PCL, etc., to a sequence of graphics primitives like text, polygon fills, images, etc. These graphics primitives are then scan converted onto the frame buffer to generate the output pixel map. In this embodiment of the invention, the RIP would not only perform the scan conversion per pixel but also perform the class generation per macroblock.

Each macroblock is marked as text, graphic fills, contone, etc., based upon the objects being drawn in the macroblock. Because the class generation is at a lower resolution than scan conversion (for example, a 10×10 macroblock corresponds to a 60/10, or 60, dpi resolution, compared to a 600 dpi pixel resolution) the overhead is minimal. This class information will be used to adapt the compression method.

To increase the correlation between adjacent pixels, the pixels in a cell are rescanned. This makes the data more readily compressible. The rescanning order is chosen based upon the cell population approach used in multi-level screening. An example of this type of rescanning is shown in FIGS. 2a–2c.

Additionally, the rescanning order could be prestored in a two-dimensional array, such as a look-up table, as shown in FIG. 2a. This new order will be referred to as a prestored order.

Using the classes of pixels in FIG. 1a, the pixels in FIG. 2a are rescanned in the order shown, based upon their class. Their scan order would be almost circular in nature. Once the data is rescanned, it could be stored in 1 dimension as 1, 2, 3, 4, 5 . . . 25. Alternately, it could be stored in two dimensions as shown in FIG. 2b.

Another possibility would be to rescan the pixels by class from cell to cell. All pixels of the same class would be scanned from each of the cells. In this case, the scan sequences would be as follows:
rescan sequence 1: 1, 2, 3, 4 . . . (for entire row of cells)
rescan sequence 2: a, b, c, d, e, f, g, h, I, j, k, l, m, n, o, p . . . for entire row of cells
rescan sequence 3: A, B, C, D, E, F, G, H, I, J, K, L, M, N, O, P . . . for entire row Once the pixels are rescanned, the data from the pixels within these cells would be compressed. Compression can be based upon two different choices, lossless or lossy compression. Lossless compression returns an image that is as good as the original. Lossy compression returns an image that is not as good as the original. Lossy compression methods include transform methods, vector quantization, among others. Lossless methods include dictionary based compression schemes, lossless differential pulse code modulation (DPCM), as examples. An example of a flow chart with both lossy compression, in path 26, and lossless, in path 24, is shown in FIG. 3.

Any of these methods can be applied to the rescanned pixels. In addition, one can mix compression techniques. For example, lossy methods could be used for contone areas and lossless for text and graphics areas. For lossy compression rate control techniques (like those used in MPEG (Motion Pictures Expert Group)) can be used. For an example, the rescanned data in the cell is transformed using a discrete cosine transform (DCT) at step 12, quantized at 14, runs (which are consecutive pixels with a common gray scale) determined and the resultant data is entropy coded. The output buffer 16 is then monitored for fullness and the buffer fullness measure 18 can be used to control the quantization scale factor to regulate the output bit rate. In addition, the output compression factor 20 can be monitored. If it exceeds the target compression factor, the quantization scale factor is reduced to improve image quality and maintain a compression ratio close to the target compression ratio.

The coded bit stream, having been compressed, will occupy significantly less storage area than a complete frame buffer and will therefore result in cost savings in the system. Further, it also reduces the bandwidth of data to be sent into the marking module. However, the bandwidth reduction is at the expense of providing a decompressor in the marking module. This scheme can be used for each of the typical four color planes, cyan, magenta, yellow and black.

Lossy compression schemes can also be used in different ways on different image content. For example, one lossy compression embodiment may be more useful for image and solid areas, and another for text.

One embodiment of a lossy compression scheme for image and solid areas, the effective gray level of a cell can be computed as the sum of all the individual cells. For example, in a 3×3 cell where three cells within the macrocell have the level of 15 and all other six have the level of 0, the level of 45 (15+15+15) would be transmitted.

An embodiment of lossy compression schemes for text areas uses the typical classification that text areas are either 15s or 0s. A black spot corresponds to 15 and white to 0. Only one bit is transmitted per pixel instead of 4. To achieve further compression, certain small bit patterns can be prestored and only the index transmitted. For example, a 3×3 cell could possibly have $2^9$=512 bit map combinations. But a set of 64 could be stored, and the closest match transmitted, thereby reducing the number of bits by a factor of 8.

As mentioned earlier, the lossy techniques can be mixed with lossless techniques, or either one can remain separate. One example of a technique that can be lossless or lossy is DPCM. In DPCM, the current pixel is predicted based upon previous pixels and the difference signal between actual and predicted values is quantized and coded. If the quantization factor is 1, then the coding is lossless, if it is greater than 1, the coding is lossy.

Several methods can be used for prediction. These include using the previous pixel or some average over a neighborhood group of pixels. In this embodiment, a DPCM compression prediction is used for certain screening methods. As an example, suppose the multi-level screening method is to work on a printer with 16 output levels. The printer has the cell structure and tone curves as shown in FIGS. 4a and 4b.

Such a screening approach as shown in FIG. 4a, where the pixels are filled one after the other sequentially is used in multi-level printing. The following prediction scheme is useful in this case.

$$A_0 = \begin{cases} g & \text{if } g \ 9\ 15 \\ 15 & \text{otherwise} \end{cases} \qquad A_i = \begin{cases} 0 & \text{if } a_{i-1} < 15 \\ i \leftarrow 0 & \\ 15 & a_{i-1} = 15. \end{cases}$$

$A_i$ is the prediction for the with pixel in the cell. $a_i$ is the output gray level of pixel i. "g" is the average output level for the previous cell.

Because the pixels are filled sequentially one after the other if pixel $a_{i-1}$ is fully filled, the probability that $a_i$ is filled is fairly high. If $a_{i-1}$ is partially filled, the probability that $a_i$ is zero is fairly high. This observation leads to the above prediction scheme. The difference between the actual and predicted values is quantized and entropy coded.

An alternate prediction scheme is to use the average output level, g, of the previous cell to generate the predicted output levels for all pixels in the cell. For example, if g=50, $A_0$=15, $A_1$=15, $A_2$=15, $A_3$=5, $A_6$=0 . . . $A_8$=0.

Other alternatives exist for certain steps in the process. For example, the rescanning step may not be necessary. In one alternative, the average value is noted for each cell. The average can be obtained from the original image or equivalently by taking the average over an integer number of periods on the multi-toned image. The entire cell is predicted based upon this average by screening the cell assuming that each pixel has the same average. This is then subtracted from the actual screened values pixel by pixel, to get the difference image. The difference image is then coded by any lossy or lossy scheme. This does require some overhead, as the average value must be sent with each cell.

In another alternative to rescanning, one could take the DCT of the original image and shape the quantization matrix so as to use smaller steps at the frequencies corresponding to the period of the screening algorithm.

Thus, although there has been described to this point particular embodiments of a method of compressing screened image data for printing, it is not intended that such specific references be considered as limitations upon the scope of this invention except in-so-far as set forth in the following claims.

What is claimed is:

1. A method of compressing multi-level screened image data, comprising:

receiving screened data of a predetermined content;

then rescanning said screened data based upon predetermined relationships between pixels to increase the correlation between adjacent pixels;

providing at least two parallel data paths for compression, each of said data paths having different properties;

selecting a data path among said at least two parallel data paths for compression responsive to said predetermined content of said screened data;

compressing said screened data in said selected data path;

encoding the compressed data;

storing said compressed data; and outputting said stored compressed data.

2. The method as claimed in claim 1 wherein said rescanning step is done based upon pixel locations in a cell relative to the center of said cell.

3. The method as claimed in claim 1 wherein said rescanning step is done based upon a prestored order.

4. The method as claimed in claim 3 wherein said rescanning is done across cells.

5. The method as claimed in claim 1 wherein said compression step is lossless and includes using predictive values of pixels based upon the value of a previous pixel.

6. The method as claimed in claim 1 wherein said compression step is lossy and includes using a predictor based upon the sum of the gray levels of pixels in the previous cell.

7. The method as claimed in claim 1 wherein said lossy compression step uses transform techniques to compress the data.

8. The method as in claim 7 wherein said transform technique further comprises differential pulse code modulation.

9. The method as claimed in claim 1 wherein said compression step is lossy and includes the use of a quantization factor that determines the rate of compression.

10. The method as claimed in claim 1 wherein said compression step is lossy includes the step of generating feedback signals to adjust the rate of said compression.

11. The method as claimed in claim 10 wherein said feedback signals include a buffer fill signal that indicates the status of said buffer.

12. The method as claimed in claim 10 wherein said feedback signals include a compression ratio signal that compares the actual compression value against a desired compression value.

13. The method as claimed in claim 1 wherein said rescanning step is eliminated.

14. The method as claimed in claim 1 wherein said content of said screened data is graphic fills.

15. The method as claimed in claim 1 wherein said content of said screened data is text.

16. The method as claimed in claim 1 wherein said content of said screened data is contone data.

* * * * *